United States Patent [19]
Bittner et al.

[11] 3,818,945
[45] June 25, 1974

[54] FLUID DISPENSING NIPPLE CONSTRUCTION

[75] Inventors: Charles W. Bittner; George F. Rexon, both of Haddonfield, N.J.

[73] Assignee: Precision Parts Company, Inc., Haddonfield, N.J.

[22] Filed: May 29, 1973

[21] Appl. No.: 364,716

Related U.S. Application Data

[62] Division of Ser. No. 235,748, March 17, 1972.

[52] U.S. Cl. .............................................. 138/89
[51] Int. Cl. ............................................ F16l 55/10

[58] Field of Search .............. 138/89, 44; 29/157 C

[56] References Cited
UNITED STATES PATENTS
2,225,513   12/1940   Summers .................... 138/44 X Primary Examiner—Jerry W. Myracle

[57] ABSTRACT

A nipple construction wherein a flexible tube is crimped to define ribs of the tube material interiorly closing the tube.

3 Claims, 7 Drawing Figures

PATENTED JUN 25 1974

FLUID DISPENSING NIPPLE CONSTRUCTION

CROSS-REFERENCES TO RELATED APPLICATIONS

This application is a division of our copending application Ser. No. 235,748, filed Mar. 17, 1972.

BACKGROUND OF THE INVENTION

As is well known to those versed in the dispensing arts, and particularly in the arts concerned with dispensing liquid foods, considerable difficulties have been experienced in providing dispensing nipples which effectively insure sanitation, are simple and easy to use in dispensing equipment, and which may be economically manufactured for sale at a reasonable cost.

SUMMARY OF THE INVENTION

It is an important object of the present invention to provide a fluid dispensing nipple which serves to completely seal a container of liquid fluid, or the like, during transit and storage to insure sanitation at the point of use, and is capable of sale at a price economically justifying disposal after a single usage.

It is still another object of the present invention to provide a nipple construction having the advantageous characteristics mentioned in the preceding paragraph, overcomes the hereinbefore mentioned difficulties of the prior art, and which is extremely simple to use in conjunction with fluid containers and dispensing mechanisms, for example, permitting of quick and easy use by waitresses in restaurants in conjunction with milk dispensing apparatus.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
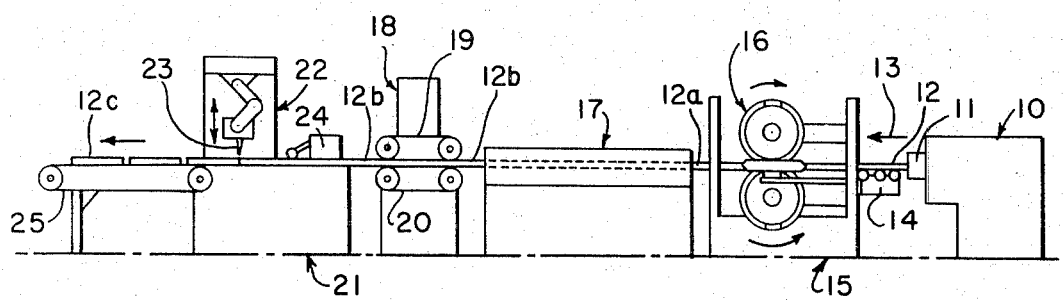
FIG. 1 is a longitudinal elevational view, somewhat diagrammatic, showing the method and apparatus of the instant invention for use in manufacture of the dispensing nipples.

Referring now more particularly to the drawings, and specifically to FIG. 1, the manufacturing apparatus disclosed therein includes an extruder, generally designated 10, having an extruding head or die 11 from which it extrudes a plastic tube 12 in the direction of arrow 13. A conveyor 14 is located just downstream of the extruder head 11 for receiving the extruded tubing 12 to support the latter for downstream movement.

Just downstream of the extruder 10 and receiving conveyor 14 is a sealing or crimping station generally designated 15. The sealing or crimping station 15 includes sealing or crimping dies 16 which serve to seal or crimp the tubing 12 at longitudinally spaced locations along the tubing, all of which will be described more fully hereinafter.

The crimped tubing 12a proceeds downstream from the crimping station 15 afterwhich it may be cured, as by passage through a curing station 17, which may be defined by a cooling water tank.

From the curing station 17 the cured tubing 12b proceeds downstream, being pulled therealong, as through a pulling station 18 which may include one or more powered endless belts, such as an upper belt 19 and a lower belt 20, one or both of which may be suitably powered to frictionally draw the cured tubing 12 downstream and present the cured tubing to a cutoff station, generally designated 21.

The cutoff station 21 may include a cutoff mechanism 22, which may be defined by a vertically reciprocal cutoff member of knife 23 for severing the tubing 12b. Just upstream of the cutoff mechanism 23 there may be provided a sensing mechanism 24 suitably operatively connected to the cutoff mechanism for actuating the latter. The sensing mechanism 24 serves to sense the presence of a sealed or crimped tubing region, and in response thereto actuates the cutter 23 to sever the tubing into nipple length 12c for withdrawal and discharge by an output conveyor 25. For example, the sensing means 24 may effect operation of the cutoff mechanism 23 to sever the tubing 12b at a midregion of each seal or crimp, and also at a midpoint between seals or crimps, so that each nipple length 12c has one end crimped or sealed and the other end opened.

Figure 2:
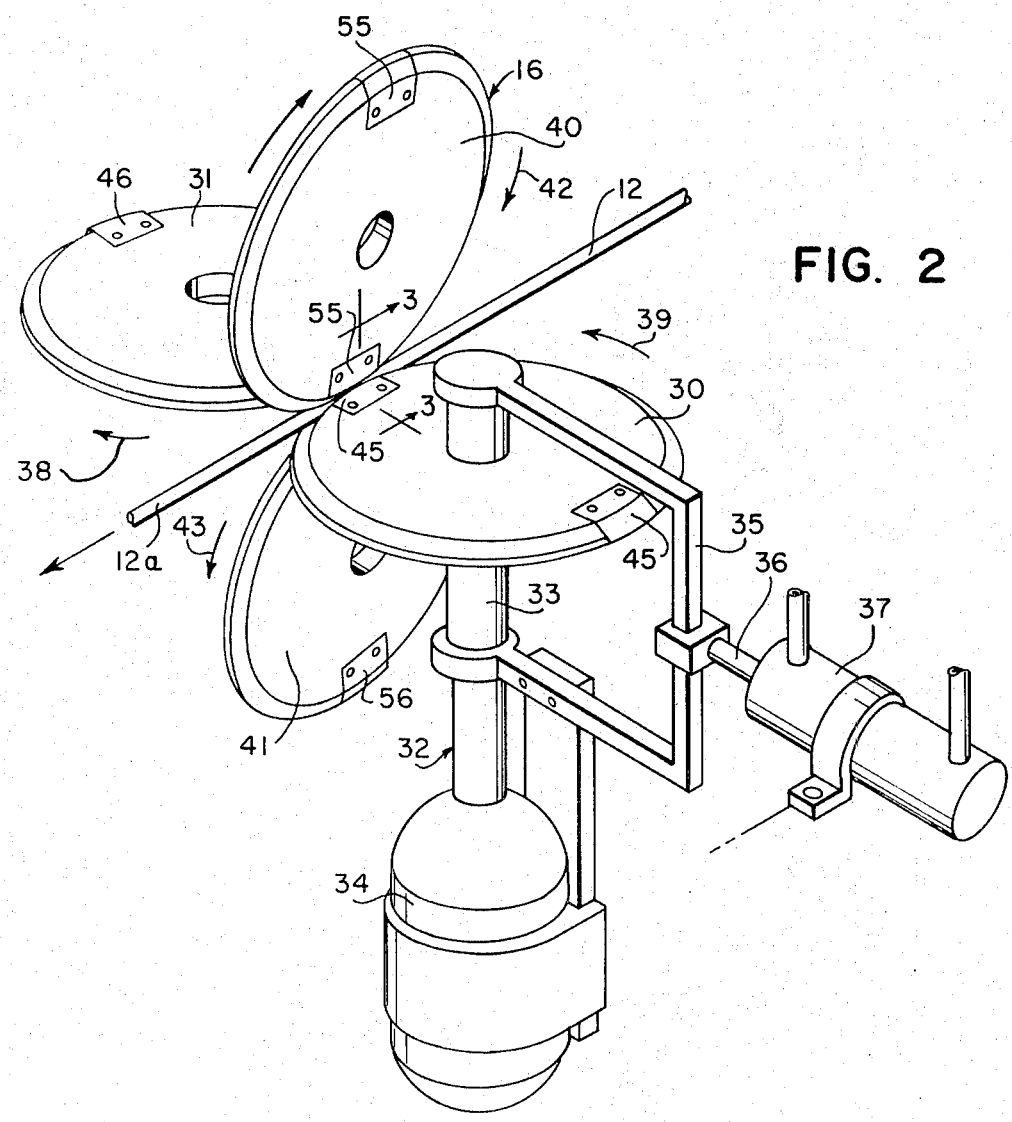
FIG. 2 is a partial top perspective view showing, in greater detail, one station of the apparatus of FIG. 1.

Referring now more particularly to the drawings, and specifically to FIG. 2 thereof, the tube crimping mechanism is there seen in greater detail as including a plurality of pairs or sets of opposed crimping members or rolls. In particular, the crimping mechanism 16 includes a pair of generally horizontal crimping members or rolls 30 and 31, being generally coplanar with each other and disposed laterally on opposite sides of the path of tubing 12. That is, the crimping members or rolls 30 and 31 are horizontally generally coplanar with each other and with the tubing 12, and are generally laterally opposite to each other so as to be substantially tangent to each other and to the same region of the tubing 12. Both of the coplanar rolls 30 and 31 are mounted for axial rotation, as about parallel, vertical axes, but for simplicity of illustration only a single rotary mount is shown, as at 32. The rotary mount may include a shaft 33 extending generally vertically through and carrying the roll 30, being axially driven for rotative movement by a motor or other suitable motive means 34. The roll mounting structure 32 is carried by a carrier or yoke 35 which may be connected by a piston rod 36 to a hydraulic cylinder 37 which may be operated to shift the crimping roll 30, together with its mounting structure 32 toward and away from the path of tubing 12, generally radially of the roll 30.

The opposite roll 31 may also be suitably mounted in a similar manner, or otherwise, if desired, it being essential that the roll 31 be rotatable generally in the direction of arrow 38 in a generally rolling relation with roll 30 rotating in the direction of arrow 39.

An additional pair of opposed crimping members or rolls 40 and 41 may be employed in conjunction with the roll 30 and 31, the additional rolls being generally coplanar in a vertical plane with each other and the path of tubing 12. The crimping members or rolls 40 and 41 are suitably mounted for simultaneous rotation, as in the direction of respective arrows 42 and 43, both with each other and the rolls 30 and 31, by suitable mounting means, omitted for clarity. Also, one or more of the rolls 40, 41 may be rotatably powered, and may be movable radially toward and away from the path of tubing 12, as desired.

It will be seen that each of the crimping members or rolls 30, 31, 40 and 41 is provided at at least one location about the periphery thereof, and in the illustrated embodiment is provided at a pair of diametrically opposed locations with crimping elements in the nature of removable and replaceable peripheral segments. In particular, the crimping member or roll 30 is provided with a pair of diametrically opposed crimping elements 45, while the oppositely disposed crimping member or roll 31 is similarly provided with a pair of diametrically opposed peripheral, segmental crimping elements 46. This is shown in both FIGS. 2 and 3. It will also there appear that the several crimping rolls 30, 31, 40 and 41 are each formed with a radially outwardly tapering periphery, as defined by a pair of circumferential bevel surfaces. In particular, the crimping roll 30 is formed with a pair of circumferential, upper and lower bevels or convergent surfaces 50 and 51, while the opposite crimping member or roll 31 is formed with similar circumferential bevels or tapering edge surfaces 52 and 53.

In like manner, the vertically disposed opposed crimping members or rolls 40 and 41 are respectively provided with diametrically opposed segmental crimping elements 55 and 56. Further, the upper crimping roll 40 is peripherally formed with a tapered or double beveled circumference as between circumferential edge surfaces 57 and 58 of the upper roll, and 59 and 60 of the lower roll.

Figure 4:
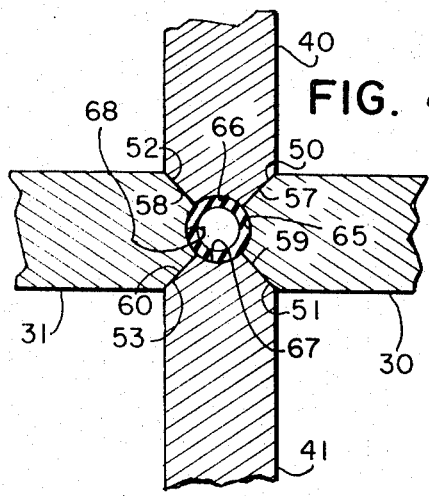
FIG. 4 is a fragmentary sectional view similar to FIG. 3, but showing another stage in the instant operation.

As seen in FIG. 4, the bevel circumferential surfaces 50 and 51 of roll 30 meet in an annular arcuately concave groove 65, while the opposite horizontal roll 30 has its circumferential bevels 52 and 53 meeting in an arcuately concave groove 65. Similarly, the circumferential bevels 57 and 58 of upper crimping roll 40 meet at an arcuately concave peripheral groove 66, while the circumferential bevels 59 and 60 of the lower crimping roll 41 meet in an arcuately concave peripheral groove 67.

As best seen in FIG. 4, the several wheels or rolls 30, 31, 40 and 41 are generally tangent to each other, with their bevel circumferential surfaces meeting and their peripheral grooves 65, 66, 67 and 68 combining to define a passageway of generally circular cross-section.

Thus, the peripheral bevels are in rolling engagement with each other, in particular the bevels 51 and 59 being in engagement with each other, as are the bevels 50 and 57 in engagement with each other, the bevels 52 and 58 being in engagement with each other and the bevels 53 and 60 being in engagement with each other. As seen in FIG. 4, the combined generally circular interior configuration of peripheral grooves 65–68 serves to receive, embracingly engage and draw along the tubing 12.

Figure 3:
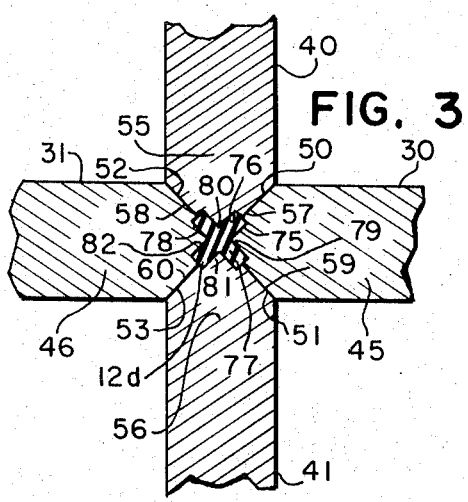
FIG. 3 is a partial transverse sectional view taken generally along the line 3—3 of FIG. 2, enlarged for clarity.

However, at the locations of the crimping or sealing elements 45, 46, 55 and 56, the peripheral surface configurations are altered to that shown in FIG. 3. It will there be seen that the several arcuate concave grooves 65–68 are replaced with concavities of different configuration, respectively designated 75, 76, 77 and 78. These cavities each include an interior protuberance or projection as at 79, 80, 81 and 82. The projections 79 and 82 of opposite crimp rolls 30 and 31 protrude directly toward each other, while the projections 80 and 81 of the vertically opposed crimp rolls 40 and 41 protrude directly toward each other. However, the projections or protuberances 79, 80, 81 and 82 are each recessed into its respective crimping element 45, 55, 56 and 46, so that the opposed protuberances are spaced from each other.

The hollows or concavities 75, 76, 77 and 78 are all configured and combined to define a closed cross-sectional hollow, being of cruciform configuration in the illustrated embodiment. Further, the projections 79, 80, 81 and 82 project into the configuration of the closed hollow 75, 76, 77 and 78. By this means the material of tube 12 is squeezed, crimped, compressed or closed, as at 12d to define a seal at intermittent, spaced locations along the tubing.

The cross-sectional area of the interior hollow defined by complementary concavities 75, 76, 77 and 78 is sufficient to insure complete closure and a squeezing, sealing action to the crimped region 12d. Further, in practice the crimped region 12d is formed with parting or molding lines, as at 85, along the outer edge of each ridge or cross part of the seal 12d. These parting or mold lines are formed by the forcing of plastic material between the rolling surfaces of the crimping rolls, and the presence of these parting or mold lines insures that the crimp 12d has been completely closed or sealed.

Figure 5:
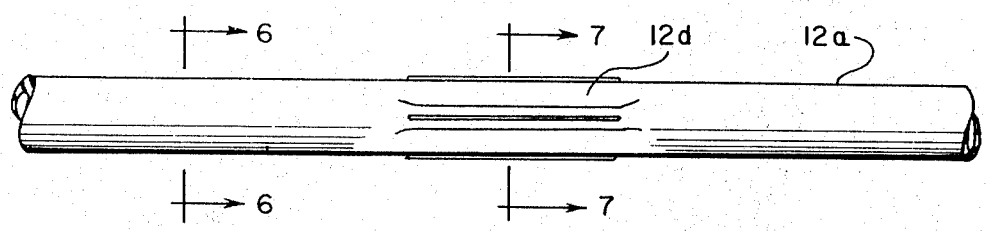
FIG. 5 is a partial longitudinal view showing tubing formed in accordance with the teachings of the present invention.
Figure 6:
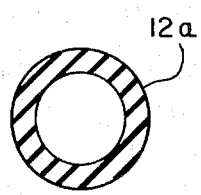
FIG. 6 is a transverse sectional view taken generally along the line 6—6 of FIG. 5.
Figure 7:
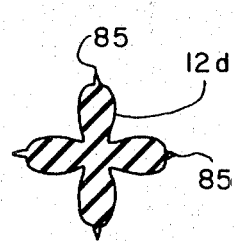
FIG. 7 is a transverse sectional view taken generally along the line 7—7 of FIG. 5.

Subsequent to the hereinbefore described crimping operation, the intermittently sealed tubing is cured, as at station 17 in FIG. 1, and severed at station 21 into separate nipple lengths 12c. The severing may take place, as along section lines 6 and 7 of FIG. 5, resulting in a nipple having one end open and one end closed by the seal 12d.

As appears from the formation of the seal 12d, it will be appreciated that the peripheral cross-sections of the crimping elements, as seen in FIG. 3, merge smoothly into those of the remainders of the wheels, as seen in FIG. 4. Thus, it may be considered that the crimping elements 45, 46, 55 and 56 move radially inwardly and outwardly toward and away from the tubing 12, while moving longitudinally therealong to apply the radially inward crimping or sealing forces and simultaneously draw the tubing from the extruder 10. The crimping or sealing is effected by a squeezing or pinching action as between the opposite protrusions 79, 80, 81 and 82, and further by the substantial encompassing of the sealed material within the closed configuration defined by the combined facing recesses 75, 76, 77 and 78.

From the foregoing, it is seen that the present invention provides a unique fluid dispensing nipple which is capable of insuring sanitation of associated fluid at the point of use, extremely economical to produce and assemble, being capable of quick and easy usage by unskilled persons, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A nipple construction for a fluid dispensing container, said construction being fabricated entirely of thermoplastic material and comprising a flexible tube having one end of open circular configuration to be connectible to a dispensing container, and a crimped formation entirely closing the other end of said tube and terminating spaced from said one tube end, said crimped formation comprising a plurality of longitudinally extending ribs formed of the material of said tube and radiating from the tube axis outwardly in angularly spaced relation, said ribs being internally solid and having their radially inner regions completely integrally joined together to completely close said tube.

2. A nipple according to claim 1, in combination with a parting mold line on each rib indicating the solid cross-section thereof.

3. A nipple construction according to claim 1, said ribs being four in number and equally angularly spaced apart.

* * * * *